United States Patent
Terblanche et al.

(10) Patent No.: US 11,372,931 B2
(45) Date of Patent: Jun. 28, 2022

(54) METHOD AND SYSTEM FOR COLLECTING, VISUALISING AND ANALYSING RISK DATA

(71) Applicant: KPMG Australia IP Holdings Pty Ltd., Sydney (AU)

(72) Inventors: Andries Terblanche, Sydney (AU); Mike Ashley, Sydney (AU); Tony Kong, Sydney (AU); Wayne Jenkins, Sydney (AU)

(73) Assignee: KPMG Australia IP Holdings Pty Ltd., Sydney (AU)

( * ) Notice: Subject to any disclaimer, the term of this patent is extended or adjusted under 35 U.S.C. 154(b) by 195 days.

(21) Appl. No.: 16/339,902

(22) PCT Filed: Oct. 6, 2017

(86) PCT No.: PCT/IB2017/056167
§ 371 (c)(1),
(2) Date: Apr. 5, 2019

(87) PCT Pub. No.: WO2018/065942
PCT Pub. Date: Apr. 12, 2018

(65) Prior Publication Data
US 2020/0050631 A1    Feb. 13, 2020

(30) Foreign Application Priority Data
Oct. 7, 2016    (AU) ................ 2016904078

(51) Int. Cl.
| G06F 16/00 | (2019.01) |
| G06F 16/904 | (2019.01) |
| G06F 3/04845 | (2022.01) |
| G06F 3/04847 | (2022.01) |
| G06F 3/0488 | (2022.01) |
| G06K 9/00 | (2022.01) |

(52) U.S. Cl.
CPC .......... *G06F 16/904* (2019.01); *G06F 3/0488* (2013.01); *G06F 3/04845* (2013.01); *G06F 3/04847* (2013.01); *G06K 9/00718* (2013.01)

(58) Field of Classification Search
CPC ............... G06F 16/904; G06F 3/04845; G06F 3/04847; G06F 3/04848; G06K 9/00718
USPC ....................................................... 715/200
See application file for complete search history.

(56) References Cited

U.S. PATENT DOCUMENTS

| 6,115,646 A * | 9/2000 | Fiszman ................ G06Q 10/10 700/104 |
| 7,359,865 B1 * | 4/2008 | Connor .................. G06Q 40/08 705/7.28 |

(Continued)

OTHER PUBLICATIONS

GCFGlobal, "Publisher 2003: Formatting Lines and Backgrounds", 3 pages, Sep. 1, 2003 + Amazon.com Product Page Publisher 2003 Page Listing (6 pages); 9 pages total.*

*Primary Examiner* — William L Bashore
*Assistant Examiner* — David Faber
(74) *Attorney, Agent, or Firm* — Dentons Durham Jones Pinegar

(57) ABSTRACT

A method, comprising: displaying, on a user device, graphical objects representing risks; receiving, from the user device, gesture inputs via the graphical objects to collect risk data for the risks; providing a graphical risk model representing the risks and the collected risk data for display on the user device.

10 Claims, 12 Drawing Sheets

(56) References Cited

U.S. PATENT DOCUMENTS

| | | | |
|---|---|---|---|
| 9,032,533 B2* | 5/2015 | Bennett | G06F 21/577 |
| | | | 726/25 |
| 9,740,382 B2* | 8/2017 | Pettus | G06F 3/04847 |
| 10,282,703 B1* | 5/2019 | Contarino | G06Q 10/10 |
| 2005/0228622 A1* | 10/2005 | Jacobi | G06Q 40/08 |
| | | | 703/2 |
| 2006/0085767 A1* | 4/2006 | Hinckley | G06F 3/04842 |
| | | | 715/863 |
| 2007/0005477 A1* | 1/2007 | McAtamney | G06Q 40/06 |
| | | | 705/35 |
| 2008/0012859 A1* | 1/2008 | Saillet | G06T 11/60 |
| | | | 345/440 |
| 2008/0155335 A1* | 6/2008 | Klein | G06K 9/622 |
| | | | 714/37 |
| 2011/0087650 A1* | 4/2011 | Mackay | G05B 15/02 |
| | | | 707/722 |
| 2012/0290989 A1* | 11/2012 | Li | G06Q 10/0635 |
| | | | 715/853 |
| 2012/0317509 A1* | 12/2012 | Ludwig | G06F 17/10 |
| | | | 715/781 |
| 2014/0258174 A1* | 9/2014 | Hall | G06Q 40/06 |
| | | | 705/36 R |
| 2015/0033080 A1* | 1/2015 | Lee | G06F 11/0769 |
| | | | 714/39 |
| 2016/0132819 A1* | 5/2016 | Horner | G06Q 10/063114 |
| | | | 705/7.15 |
| 2016/0212166 A1* | 7/2016 | Henry | G06F 21/604 |
| 2016/0266890 A1* | 9/2016 | Aleksandrov | G06F 8/65 |
| 2016/0371859 A1* | 12/2016 | Fujimori | G06F 1/1639 |
| 2019/0188616 A1* | 6/2019 | Urban | G06Q 10/0875 |

* cited by examiner

METHOD AND SYSTEM FOR COLLECTING, VISUALISING AND ANALYSING RISK DATA

A portion of the disclosure of this patent document contains material which is subjected to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to a method and system for collecting, visualising and analysing risk data.

BACKGROUND

Risk assessment involves the collection, presentation and analysis of data about risks. Risk data are conventionally collected using surveys, and then presented in spreadsheets for analysis.

Conventional approaches to collecting, presenting and analysing risk data suffer from various drawbacks. Surveys are subject to a host of biases that lead to inaccuracies in the collected risk data. Spreadsheets bury interconnections between various risks in tables, columns and rows of vast quantities of collected risk data.

In this context, there is a need for improved solutions for risk assessment.

SUMMARY

According to the present invention, there is provided a method, comprising:
 displaying, on a user device, graphical objects representing risks;
  receiving, from the user device, gesture inputs via the graphical objects to collect risk data for the risks;
  providing a graphical risk model representing the risks and the collected risk data for display on the user device.

The collected risk data may comprise interconnectedness, likelihood, severity, velocity, and combinations thereof.

The graphical objects may comprise an array of shapes representing the risks, and the gesture inputs may comprise clicking on the shapes to select lines interconnecting the risks.

The gesture inputs may further comprise clicking on the lines to select line thicknesses representing strengths of interconnectedness between the risks.

The graphical objects may further comprise shapes representing the risks on a graph of likelihood versus severity, and the gesture inputs may comprise dragging the shapes on the graph to select severities and likelihoods of the risks.

The graphical objects may further comprise shapes representing the risks on sliders, and the gesture inputs may comprise sliding the shapes on the sliders to select velocities of the risks.

The graphical risk model may comprise a node-link graph comprising nodes representing the risks and links representing interconnectedness between the risks, wherein relative interconnectedness between the risks is represented by link thickness, and wherein relative likelihood, severity and velocity of the risks are represented by node size.

The method may further comprise displaying node clusters in the node-link graph, wherein node clusters represent groups of strongly interconnected risks. The node clusters may be graphically represented by lassos around the groups of strongly interconnected risks.

The method may further comprise displaying node centrality in the node-link graph, wherein the node centrality represents risks that strongly influence or are strongly influenced by other risks. The node centrality may be represented by arrows pointing towards the strongly influential or strongly influenced risks.

The present invention also provides a system, comprising:
 a processor; and
 a non-transitory computer-readable medium coupled to the processor and having instructions stored thereon, which, when executed by the processor, cause the processor to perform operations comprising:
  displaying, on a user device, graphical objects representing risks;
  receiving, from the user device, gesture inputs via the graphical objects to collect risk data for the risks;
  providing a graphical risk model representing the risks and the collected risk data for display on the user device.

The present invention further provides a non-transitory computer-readable medium having instructions stored thereon, which, when executed by a processor, cause the processor to perform operations comprising:
 displaying, on a user device, graphical objects representing risks;
 receiving, from the user device, gesture inputs via the graphical objects to collect risk data for the risks;
 providing a graphical risk model representing the risks and the collected risk data for display on the user device.

BRIEF DESCRIPTION OF DRAWINGS

Embodiments of the invention will now be described by way of example only with reference to the accompanying drawings, in which.

DESCRIPTION OF EMBODIMENTS

Figure 1:
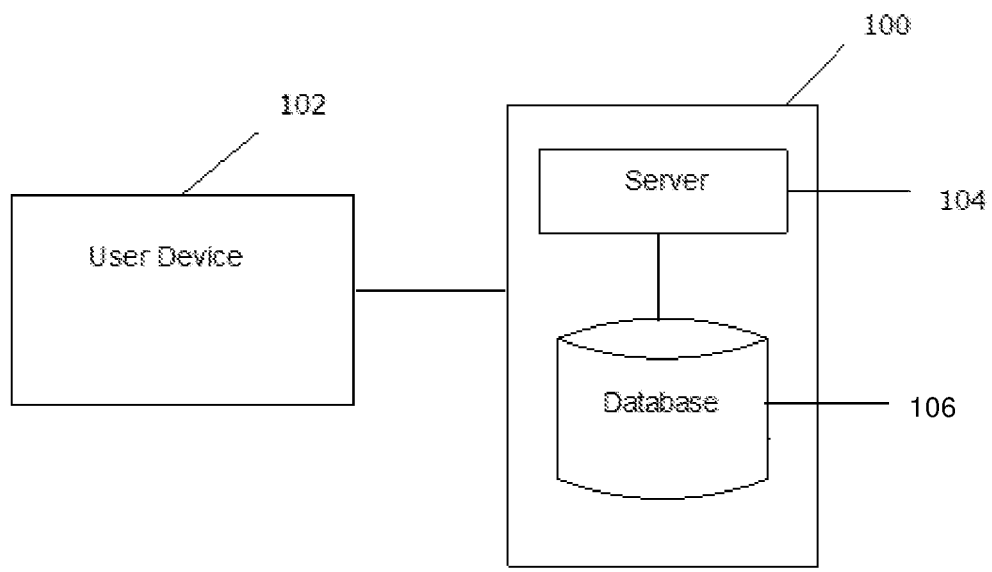
FIG. 1 is a schematic diagram of an example risk assessment system.

FIG. 1 shows an example risk assessment system 100. The risk assessment system 100 is an example of a risk assessment system that may be implemented as computer programs on one or more computers in one or more locations, in which the systems, components, and techniques described below can be implemented.

A user may interact with the risk assessment system 100 through a user device 102. The user device 102 may generally include a memory for storing instructions and data, and a processor for executing stored instructions. The memory may include both read only and writable memory. For example, the user device 102 may be a computer coupled to the risk assessment system 100 through a data communication network, eg, local area network (LAN) or wide area network (WAN), eg, the Internet, or a combination of networks, any of which may include wireless links.

The user device 102 may be a smartphone, tablet, a desktop computer, or a laptop computer. The user device 102 may be capable of receiving user inputs, eg, gesture inputs, through a touchscreen display or a pointing device, eg, a mouse. The gesture inputs may comprise any and all conventional gestures for user input via a touchscreen and/or a mouse, eg, clicking, dragging, swiping, sliding, tapping, holding, and combinations thereof.

The risk assessment system 100 may comprise one or more servers illustrated by server 104, and one or more databases illustrated by database 106. In some implementations, the risk assessment system 100 may provide interactive user interfaces to the user device 102 through which the user may interact with the risk assessment system 100. For example, the server 104 may provide the interactive user interfaces in the form of web pages that are rendered by a web application hosted on the server 104 and running on the user device 102.

Figure 2:
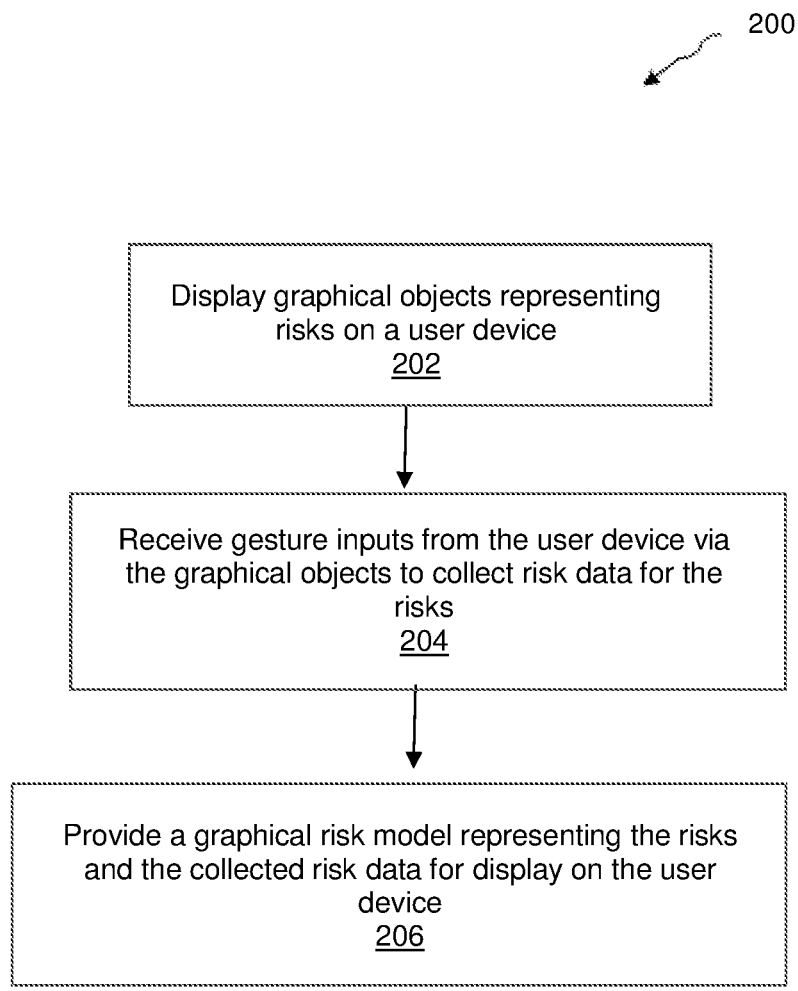
FIG. 2 is a flow chart of an example method for collecting, visualising and analysing risk data.

FIG. 2 is a flow chart illustrating an example method 200 for collecting, visualising and analysing risk data. For convenience, the method 200 will be described with reference to a system, eg, the risk assessment system 100 described with reference to FIG. 1, having one or more computing devices specially programmed to perform the method 200.

The method 200 starts by displaying, on the user device 102, interactive user interfaces comprising graphical objects representing risks (step 202). The risks may relate to an enterprise or organisation, and may be previously identified by a member or stakeholder of the enterprise or organisation.

Next, gesture inputs are received from the user device 102 via the graphical objects to collect risk data for the risks (step 204). The collection of risk data via interactive graphical user interfaces may advantageously reduce or avoid biases and fatigue associated with textual surveys. The risk data may comprise interconnectedness, likelihood, severity, velocity, and combinations thereof, of the risks. The velocity of a risk is a measure of, if the risk was to occur, how long it would take to significantly impact the enterprise or organisation. The risk data may also comprise any and all conventional risk description data and non-metric risk characterisation information.

Figure 3:
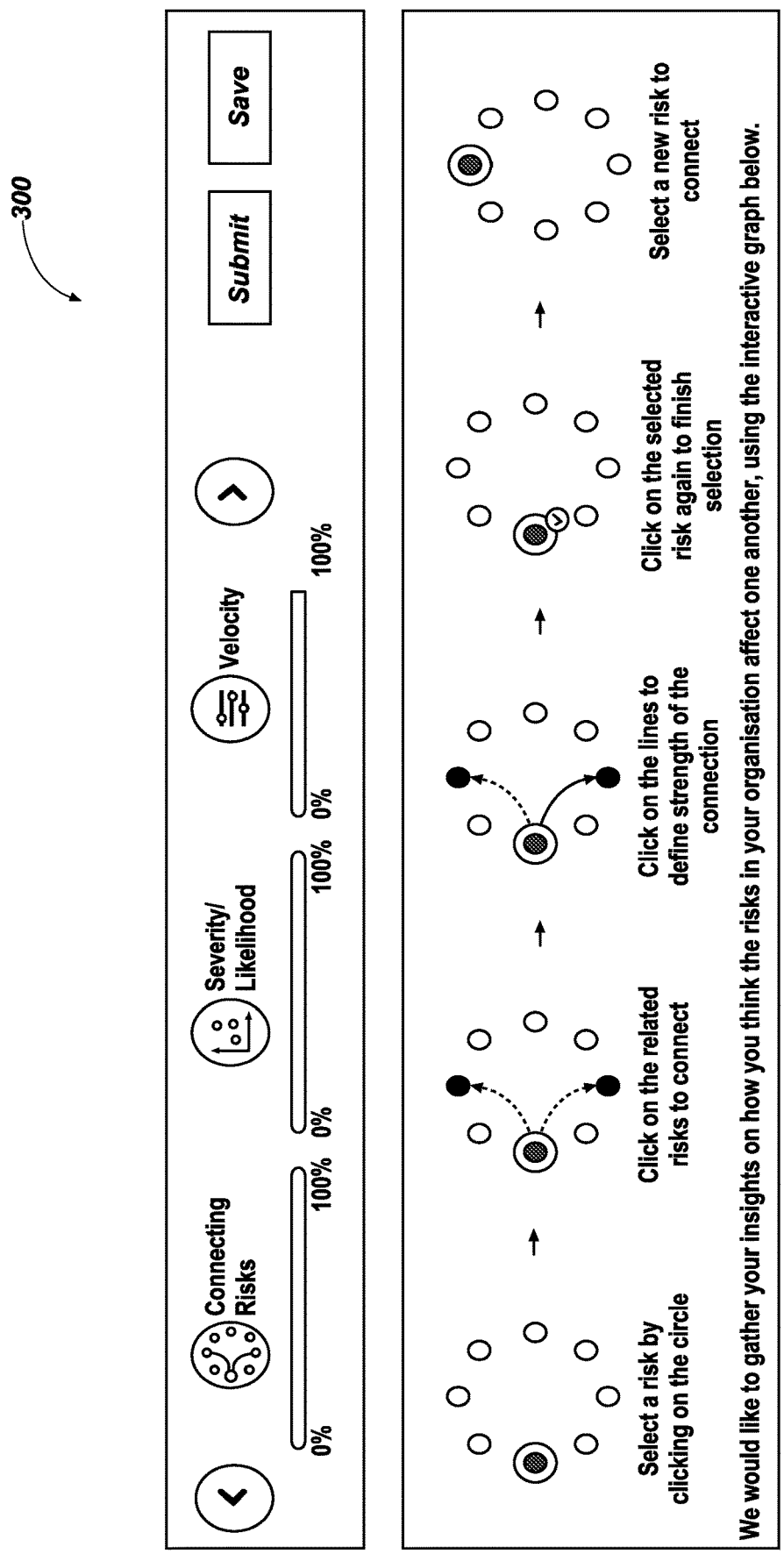
FIGS. 3 and 4 are example user interfaces for collecting interconnectedness between risks.
Figure 4:
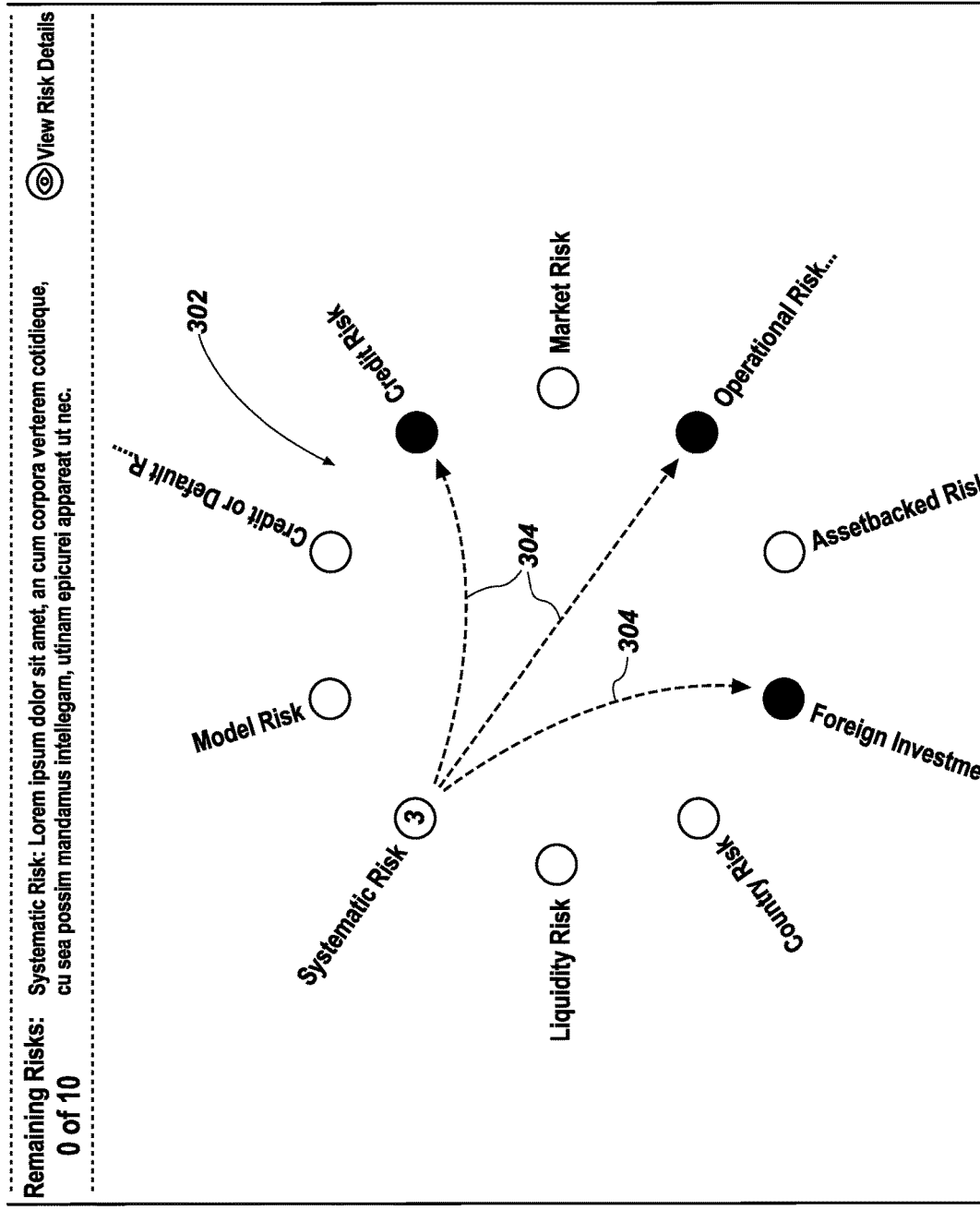

FIGS. 3 and 4 are example user interfaces that are displayed on the user device 102 to collect risk data relating to interconnectedness of the risks. FIG. 3 displays user instructions 300 for a user to select interconnectedness of the risks via the graphical objects displayed in the interactive user interface of FIG. 4. The graphical objects may comprise a geometric array 302, eg a concentric circular array, of shapes, eg, circles, representing the risks. The gesture inputs may comprise clicking on the shapes to select lines 304 interconnecting the risks. The gesture inputs may further comprise clicking on the lines 304 to select line thicknesses representing strengths of interconnectedness between the risks. Alternatively, the line thicknesses may be selected by sliding a thickness slider corresponding to the lines.

Figure 5:
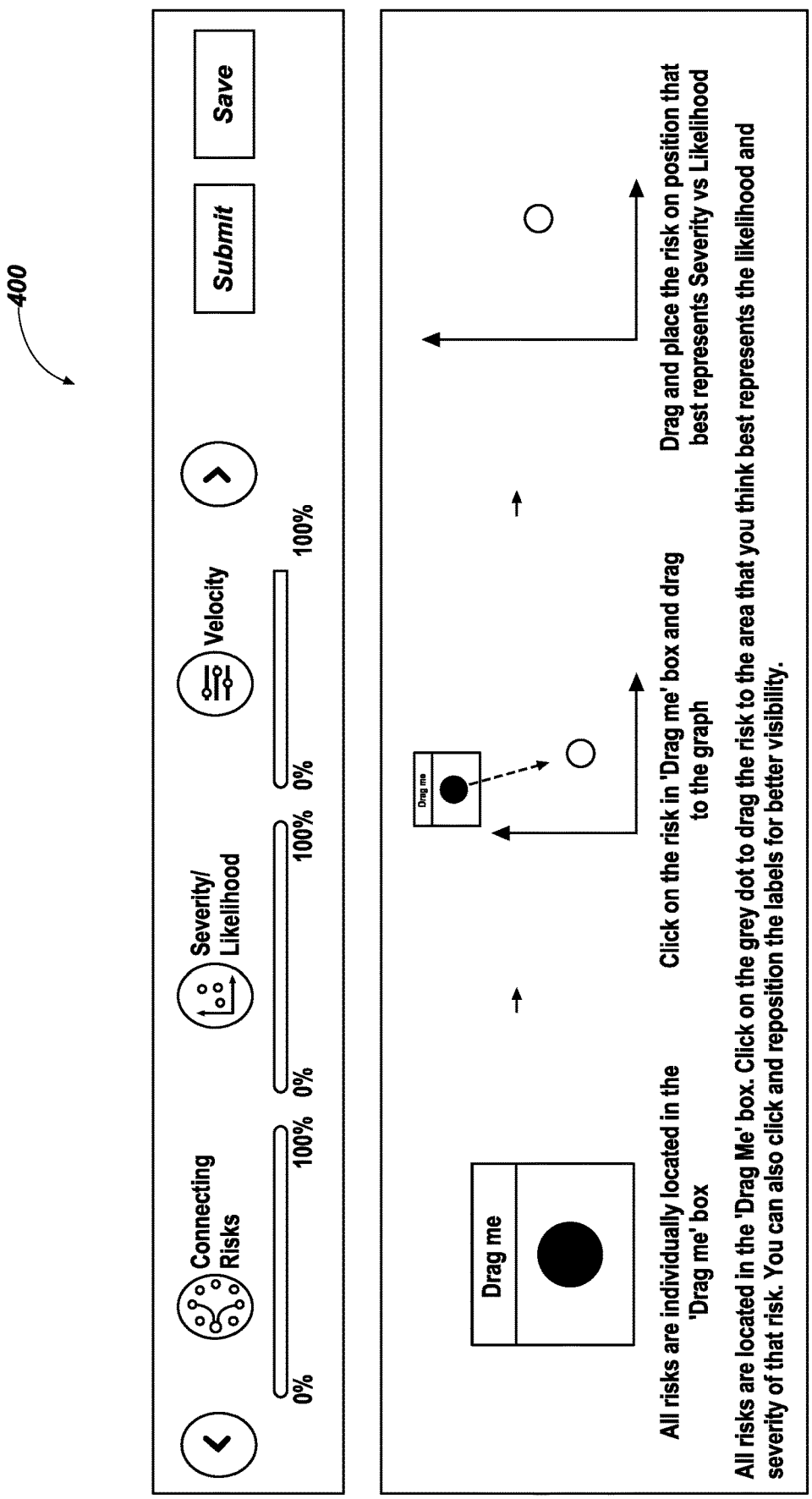
FIGS. 5 and 6 are example user interfaces for collecting likelihood and severity of risks.
Figure 6:
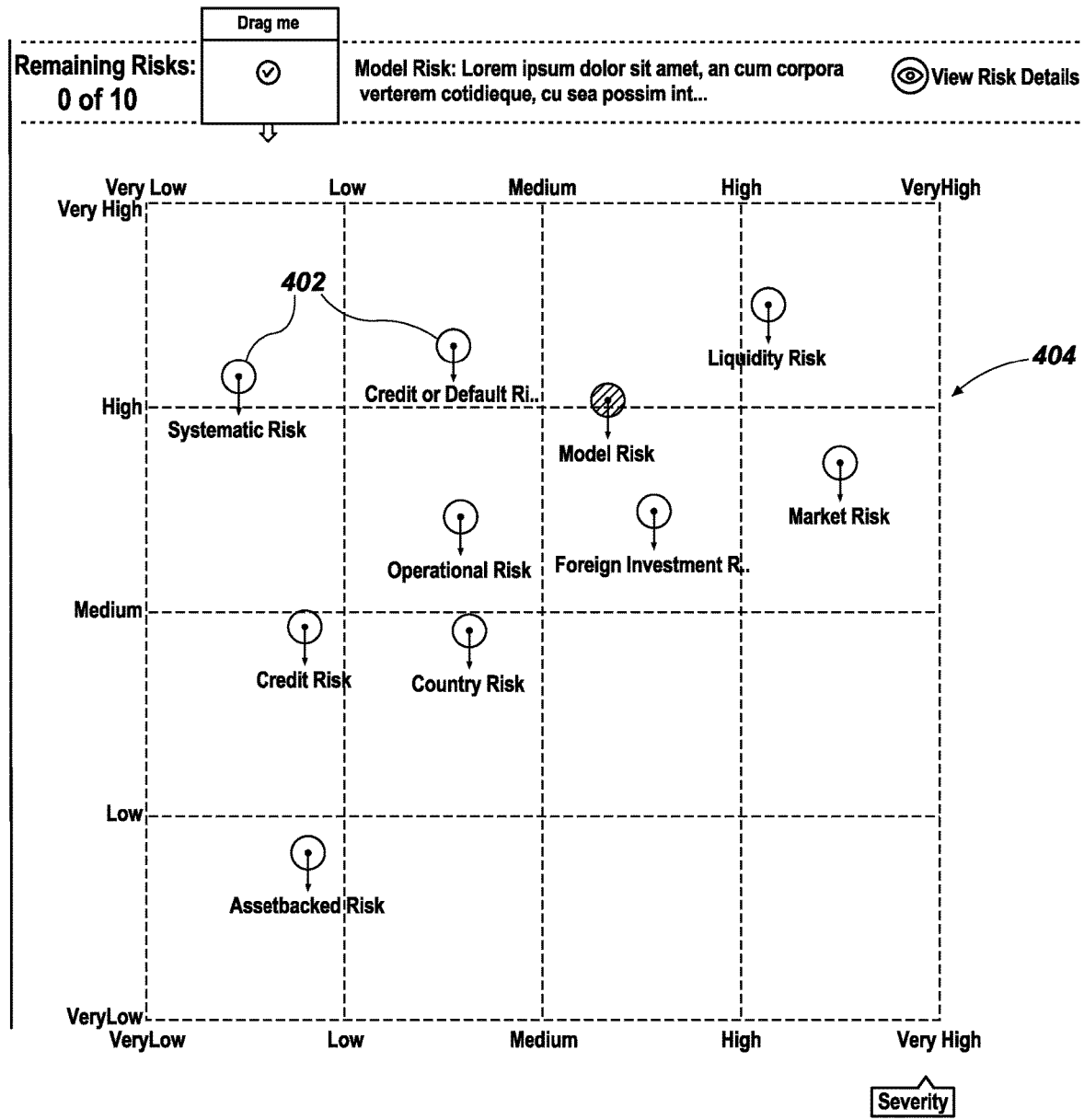

FIGS. 5 and 6 are example user interfaces that are displayed on the user device 102 to collect risk data relating to severity and likelihood of the risks. FIG. 5 displays user instructions 400 for a user to select severity and likelihood of the risks via the graphical objects displayed in the interactive user interface of FIG. 6. The graphical objects may comprise shapes, eg circles 402 in draggable boxes, representing the risks on a graph 404 of likelihood versus severity. The gesture inputs may comprise dragging the shapes 402 onto the graph 404 to select severities and likelihoods of the risks.

Figure 7:
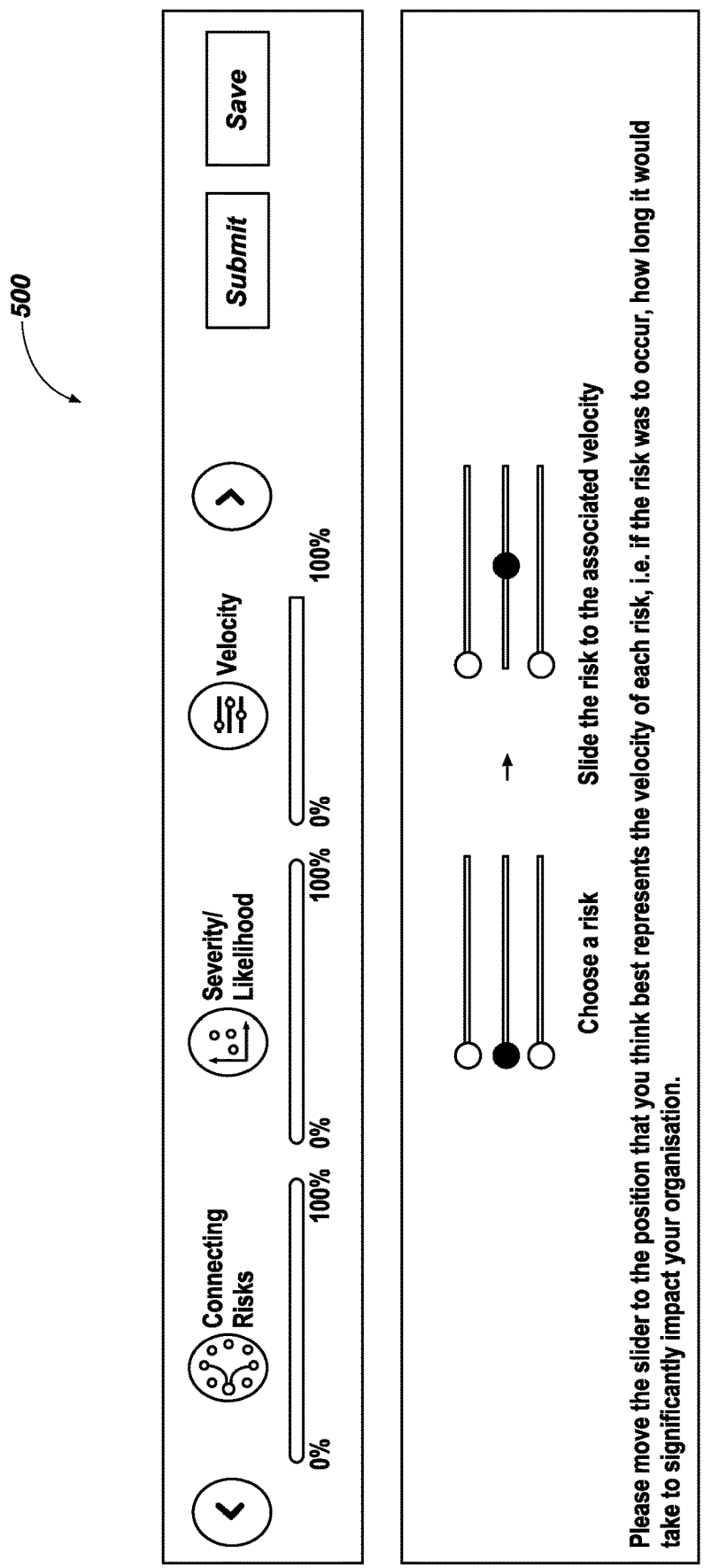
FIGS. 7 and 8 are example user interfaces for collecting velocity of risks.
Figure 8:
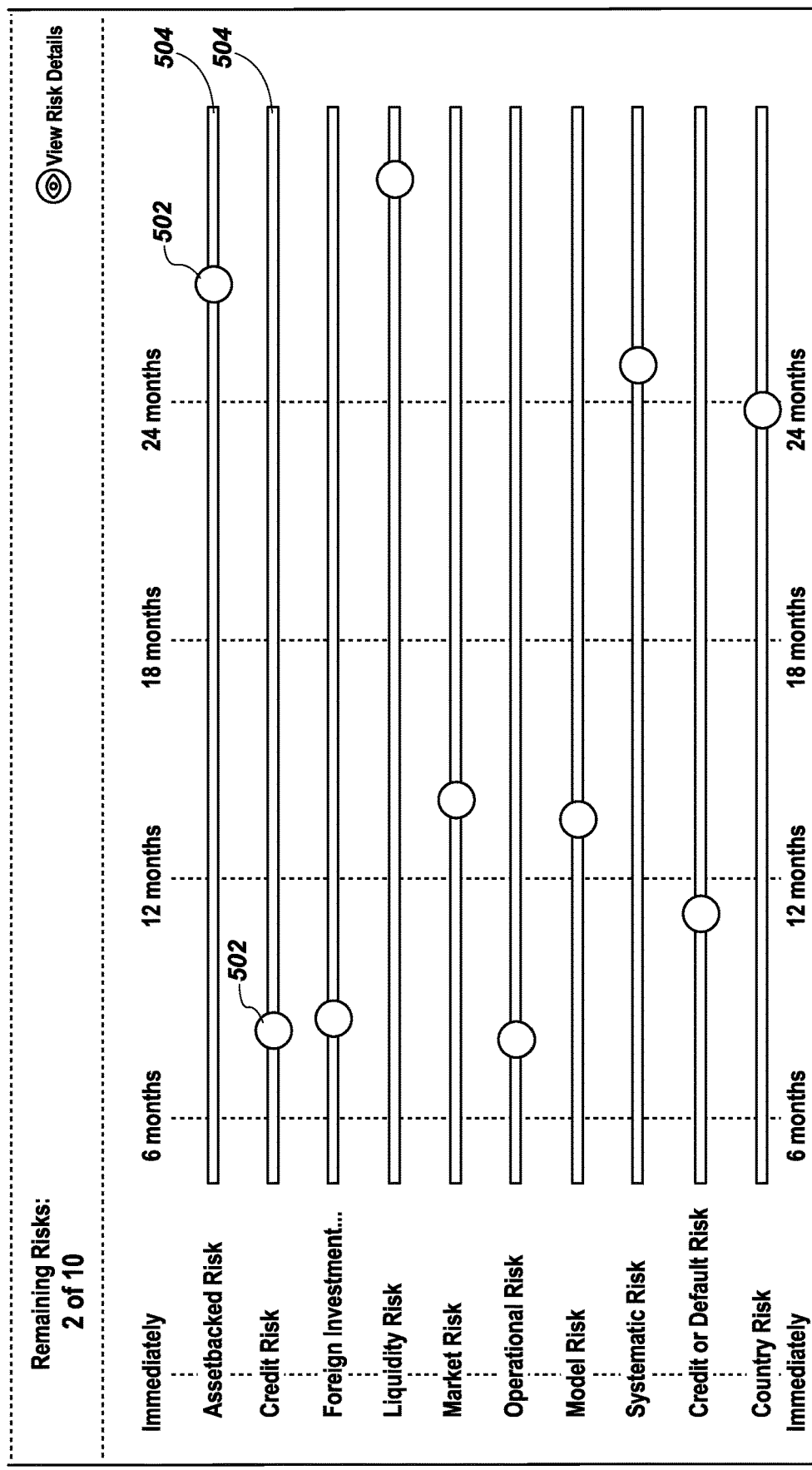

FIGS. 7 and 8 are example user interfaces that are displayed on the user device 102 to collect risk data relating to velocity of the risks. FIG. 7 displays user instructions 500 for a user to select velocity of the risks via the graphical objects displayed in the interactive user interface of FIG. 8. The graphical objects may comprise shapes, eg circles 502, representing the risks on sliders 504. The gesture inputs may comprise sliding the shapes 502 on the sliders 504 to select velocities of the risks.

Figure 9:
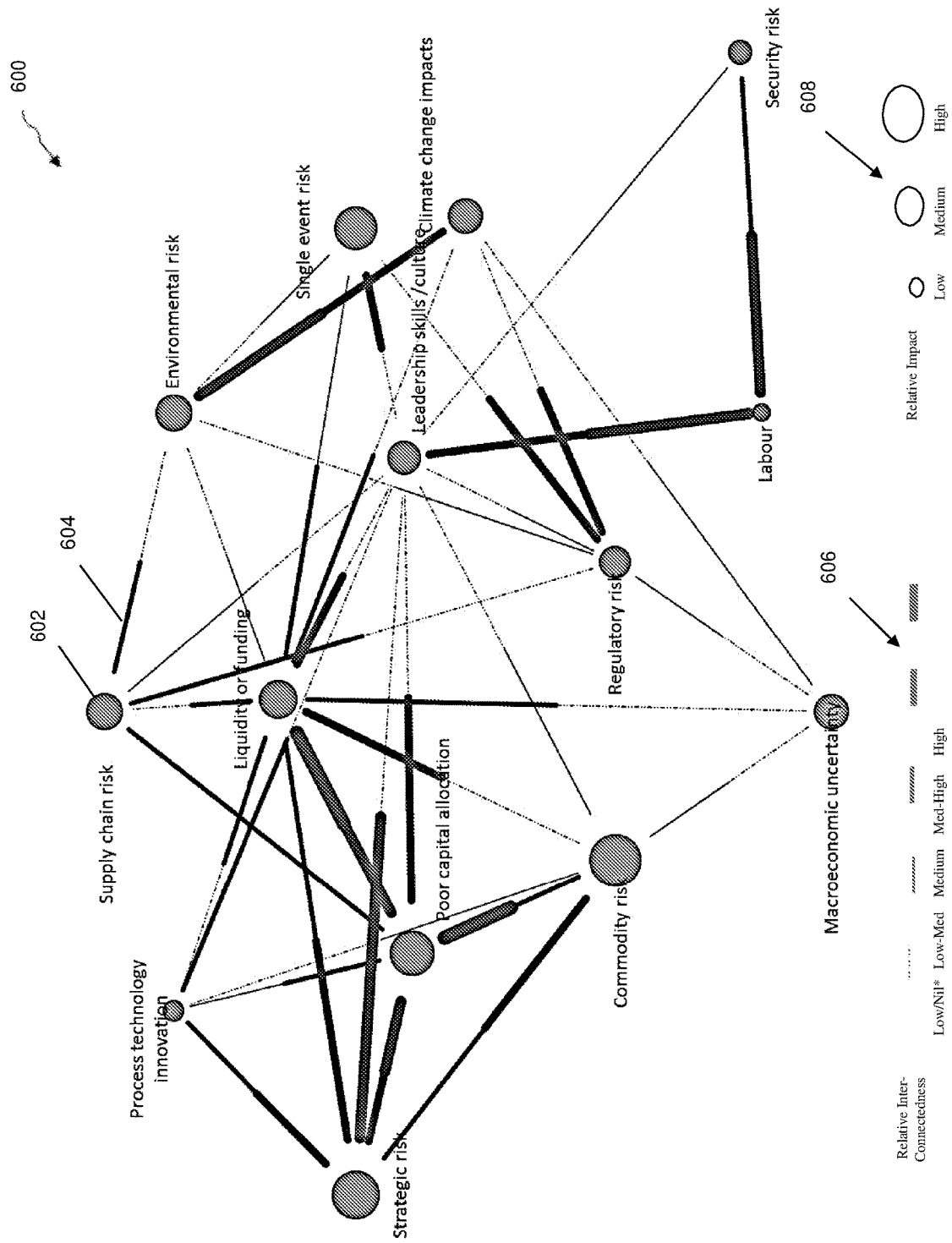
FIG. 9 is an example graphical systemic risk model.

The method 200 ends by visualising the collected risk data for the risks in a graphical risk model for display on the user device 102 (step 206). FIG. 9 is an example graphical risk model illustrated by a node-link graph (or network flow diagram) 600 comprising nodes 602 representing the risks and links 604 representing interconnectedness between the risks. The relative interconnectedness between the risks may be represented by link thickness 606, and relative likelihood, severity and velocity (collectively, relative impact) of the risks are represented by node size 608. Further or alternatively, the relative impact of the risks may be non-textually represented by any and all conventional graphical style elements or designs, such as colour, shading, line thickness, shadowing, etc. For example, the colour yellow may be used in the graphical risk model to visually represent contagion (ie, one risk infects another). Further or alternatively, the graphical risk models may be displayed as a three-dimensional models instead of two-dimensional model. For example, the nodes may be visually represented in three dimensions as spheres, and the links may be visually represented in three dimensions as cylinders having varying diameters based on their relative impacts. In addition, an interactive slider may be provided in the graphical risk model to enable a user to simulate how the risk map changes over time. The slider may be slid over user-selected time periods to dynamically display how the risks change over time. In general, the analysis and simulation of risks over time may be based on the collection of velocity of risks. Furthermore, the effects of risk contagion may be analysed over time with and without the application of risk controls (ie, immunising some risks against contagion). The method 200 may advantageously apply the science of networks and graph theory calculations, in combination with collective corporate knowledge, to analyse the expected interconnectedness of current and emerging risks as a proxy for expected correlation/contagion. It may also advantageously enable analyses of the clustering and centrality of the risks as described below.

Figure 10:
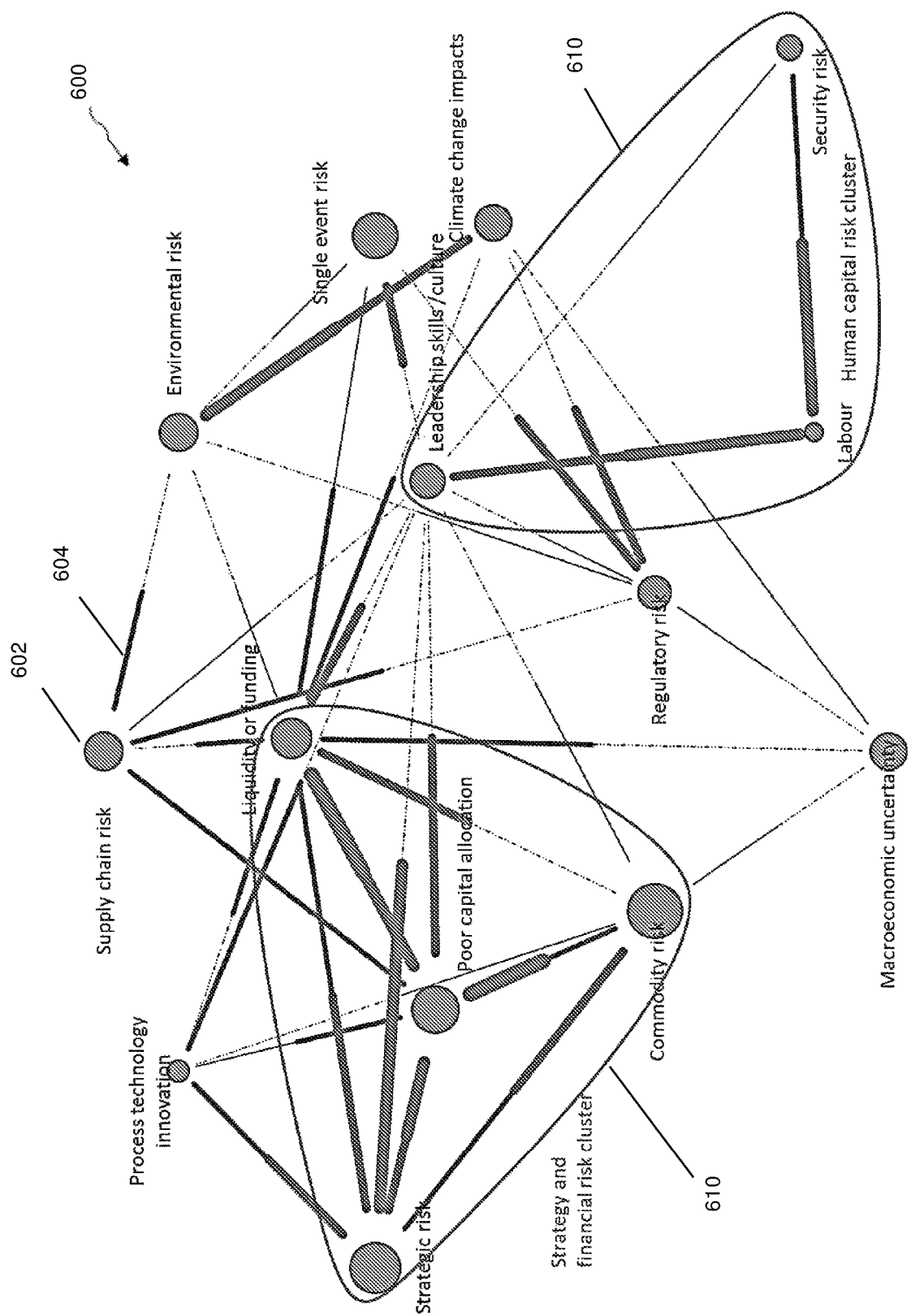
FIGS. 10 and 11 are example displays of node clusters on the graphical systemic risk model.
Figure 11:
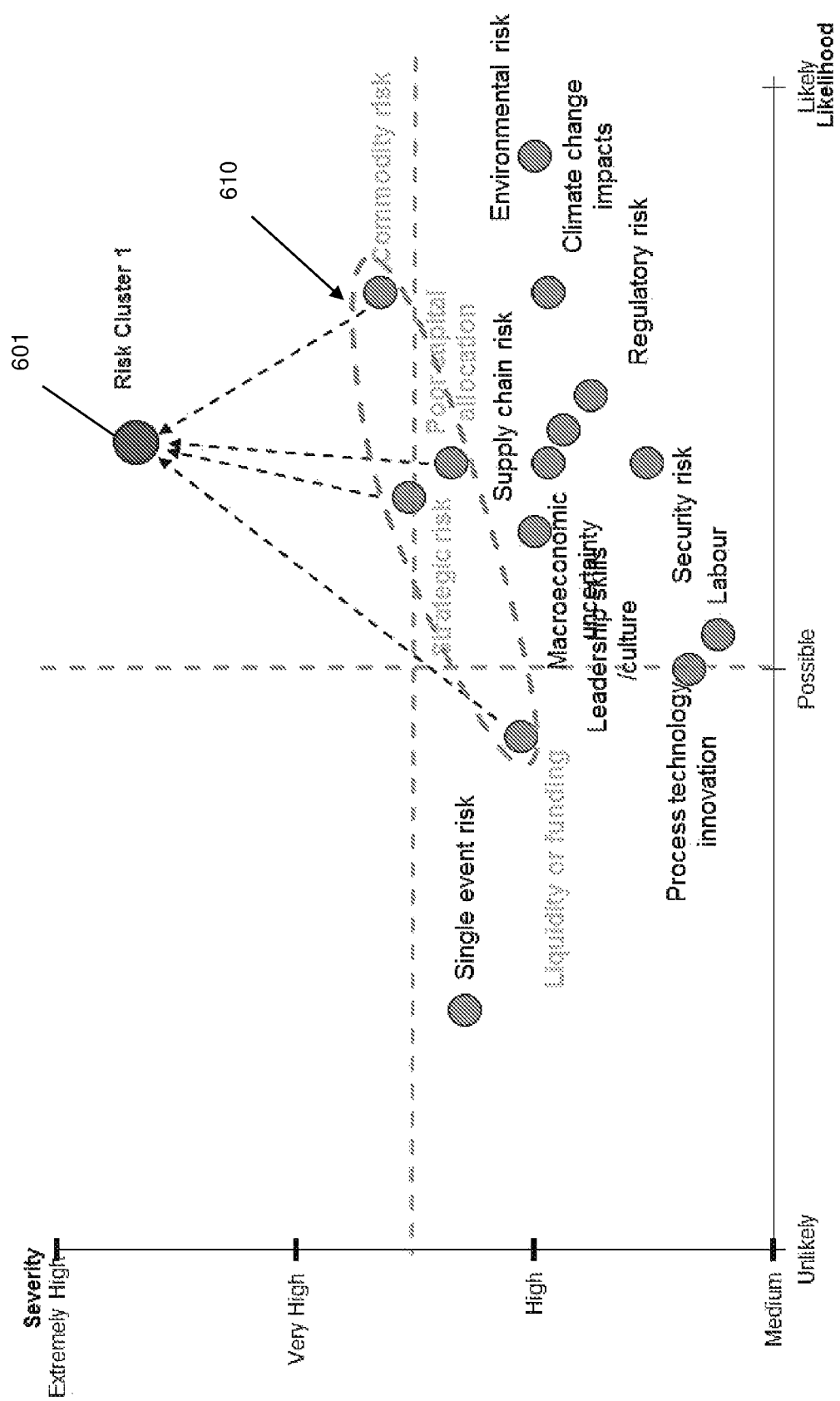

Analysis of the collected and visualised risk data may be facilitated by displaying node clusters in the node-link graph 600. Node clusters may represent groups of strongly interconnected risks. The clusters may represent a group of risks for which it is more likely for all the risks to occur at the emergence of any one of the risks within that group. As illustrated in FIGS. 10 and 11, the node clusters may be graphically represented by lassos 610 around the groups of strongly interconnected risks. The risks may be clustered based on various measures, eg:

distance and diameter: as these risks are strongly connected, they may exhibit a lower diameter (ie, shortest path between any pair of risks in that group);
  degree of completeness: each risk may be connected to each other risk in at least one direction, or bi-directionally;

weight of connection: the average weight of connection in this group may be significantly higher than the network as a whole.

Furthermore once identified, the method 200 may calculate the aggregate risk of a cluster of nodes 610. This aggregate may be re-represented as a single node 601 endowed with the aggregate severity, likelihood or other risk metric as generated by a graph theory calculation. This calculation takes the form of a mathematical integral (capacity measure) over the space of graphs including the effects of increased contagion with increased interconnectedness both within the cluster nodes as well as the effect of contagion from nodes neighbouring the cluster. This aggregate node 601 may be re-represented advantageously on the traditional severity-likelihood plot for comparison with all other nodes, as illustrated in FIG. 11.

Figure 12:
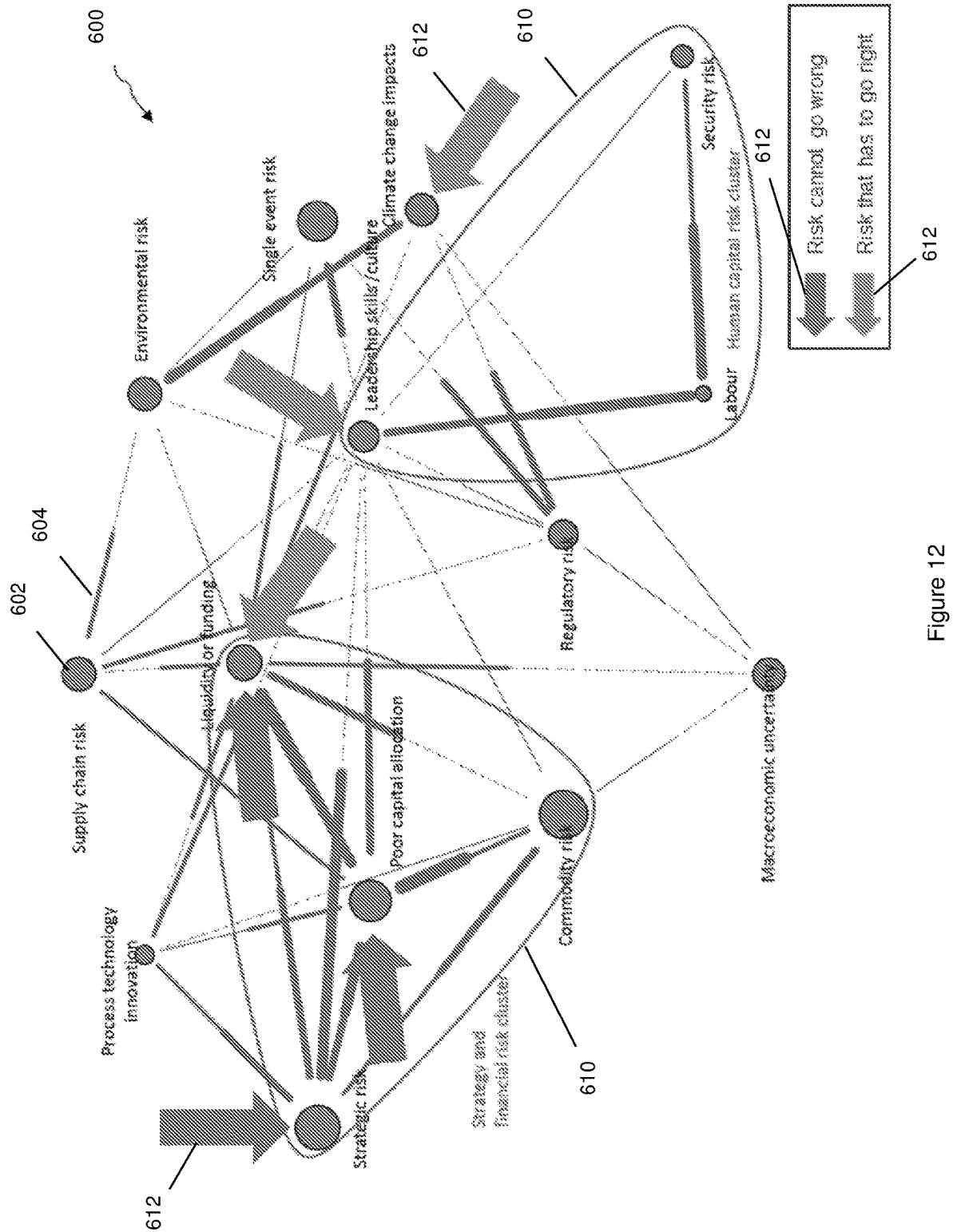
FIG. 12 is an example displays of node centrality on the graphical systemic risk model.

Further analysis of the collected and visualised risk data may be facilitated by displaying node centrality in the node-link graph 600. The node centrality may represent risks that strongly influence other risks. As illustrated in FIG. 12, the node centrality may be represented by arrows 612 pointing towards the strongly influential risks. The node centrality aims to determine the relative importance of each risk within the network. The node centrality may identify which risks have the greatest potential to influence other risks within the network. The node centrality of each risk may allow for comparison across networks and over time. The node centrality may be calculated using various measures, eg, that:

- take into account both the number of connections and the strength of those connections;
- measure how much influence the risk has over the whole network, whether this be directly or via other risks;
- take into account the outward connections from the risk, ie, a risk which has the potential to make many other risks more likely or more severe will receive a higher ranking. This measure is referred to as cause centrality and, in layman's terms, a risk with high cause centrality cannot go wrong because it has the potential to impact many other risks;
- takes into account the inward connections to the risk, i.e. a risk which is made more likely or more severe by many other risks will receive a higher ranking. This measure is referred to as effect centrality and, in layman's terms, a risk with high effect centrality must go right because it is potentially impacted by many other risks.

As illustrated in FIG. 12, 'risks that cannot go wrong' and 'risks that have to go right' may be represented on the node-link graph 600 by differently shaded arrows 612.

In addition to the dynamic risk analyses described above, other embodiments of the present invention may provide analysis of risks based on risk data collected and aggregated from multiple organisations in similar or different industries, and by comparing (or benchmarking) risk models from multiple organisations either individually or collectively. Furthermore, the collected risk data may be processed and presented to participants in real-time or near real-time to thereby provide live dynamic risk analysis. In addition, survey responses from participants may be analysed and compared to assess whether individual participants are aligned or misaligned on their perceptions of risk. It will be appreciated that embodiments of the present invention allow these and many other types of sophisticated, dynamic risk analysis to be performed and visualised.

Embodiments of the present invention provide a method and system that are useful for unbiased collection of risk data, holistic and systemic visualisation of the collected risk data, and sophisticated analysis of the visualised risk data.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A system, comprising:
a non-transitory memory; and
one or more hardware processors coupled to the non-transitory memory and configured to read instructions from the non-transitory memory to cause the system to perform operations comprising:
displaying an array of shapes representing risks;
receiving non-textual user input for drawing lines between the shapes in the array to non-textually collect data relating to interconnectedness of the risks;
displaying shapes representing the risks on a graph of likelihood versus severity;
receiving non-textual user input for dragging the shapes on the graph to non-textually collect data relating to likelihoods and severities of the risks;
displaying shapes representing the risks on slider bars; and
receiving non-textual user input for sliding the shapes on the slider bars to non-textually collect data relating to velocities of each of the risks,
wherein the velocity of each risk represents how long it would take that risk to create an impact.

2. The system of claim 1, wherein the operations further comprise receiving non-textual user input for selecting thicknesses of the lines drawn between the shapes in the array to non-textually collect data relating to strengths of interconnectedness of the risks.

3. The system of claim 2, wherein the non-textual user input for selecting thicknesses of the lines comprises clicking on the lines.

4. The system of claim 1, wherein the shapes are circles.

5. The system of claim 4, wherein the array of shapes is a circular array of circles.

6. The system of claim 1, wherein the slider bars are horizontal scroll bars.

7. The system of claim 1, wherein the operations further comprise generating a risk model using the non-textually collected data relating to the interconnectedness of the risks.

8. The system of claim 7, wherein the operations further comprise displaying a risk map representing the risk model.

9. A method, comprising:
displaying an array of shapes representing risks;
receiving non-textual user input for drawing lines between the shapes in the array to non-textually collect data relating to interconnectedness of the risks;
displaying shapes representing the risks on a graph of likelihood versus severity;
receiving non-textual user input for dragging the shapes on the graph to non-textually collect data relating to likelihoods and severities of the risks;
displaying shapes representing the risks on slider bars; and
receiving non-textual user input for sliding the shapes on the slider bars to non-textually collect data relating to velocities of each of the risks,
wherein the velocity of each risk represents how long it would take that risk to create an impact.

10. A non-transitory computer-readable medium having stored thereon computer-readable instructions executable to cause a machine to perform operations comprising:
  displaying an array of shapes representing risks;
  receiving non-textual user input for drawing lines between the shapes in the array to non-textually collect data relating to interconnectedness of the risks;
  displaying shapes representing the risks on a graph of likelihood versus severity;
  receiving non-textual user input for dragging the shapes on the graph to non-textually collect data relating to likelihoods and severities of the risks;
  displaying shapes representing the risks on slider bars; and
  receiving non-textual user input for sliding the shapes on the slider bars to non-textually collect data relating to velocities of each of the risks,
  wherein the velocity of each risk represents how long it would take that risk to create an impact.

* * * * *